United States Patent
Kim

(10) Patent No.: US 9,734,971 B2
(45) Date of Patent: Aug. 15, 2017

(54) BATTERY SAFETY DEVICE FOR VEHICLE AND METHOD OF DETECTING FAILURE THEREOF

(71) Applicant: Hyundai Motor Company, Seoul (KR)

(72) Inventor: Jang Ho Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 803 days.

(21) Appl. No.: 14/141,066

(22) Filed: Dec. 26, 2013

(65) Prior Publication Data

US 2015/0115738 A1   Apr. 30, 2015

(30) Foreign Application Priority Data

Oct. 28, 2013   (KR) .................. 10-2013-0128423

(51) Int. Cl.
*H01H 47/00*   (2006.01)
*H01H 9/54*   (2006.01)

(52) U.S. Cl.
CPC ............ *H01H 47/005* (2013.01); *H01H 9/54* (2013.01); *Y10T 307/76* (2015.04)

(58) Field of Classification Search
CPC ...................................... H01H 47/005
See application file for complete search history.

(56) References Cited

U.S. PATENT DOCUMENTS

| 6,049,269 A * | 4/2000 | Byrd ...................... B60R 25/04 |
| | | 307/10.2 |
| 2010/0085060 A1* | 4/2010 | Ichikawa ........... G01R 31/3277 |
| | | 324/503 |
| 2012/0068532 A1* | 3/2012 | Tanabe ...................... B60L 3/04 |
| | | 307/10.1 |

FOREIGN PATENT DOCUMENTS

| JP | 2007-159326 A | 6/2007 |
| JP | 2010-161009 A | 7/2010 |
| KR | 10-0837968 B1 | 6/2008 |
| KR | 10-1241226 B1 | 3/2013 |

* cited by examiner

*Primary Examiner* — Jared Fureman
*Assistant Examiner* — James Evans
(74) *Attorney, Agent, or Firm* — McDermott Will & Emery LLP

(57) ABSTRACT

A battery safety device for a vehicle and a method of detecting failure thereof is installed between a high-voltage battery mounted on the vehicle and a power line. The device includes a first main relay connected to a positive terminal of the battery in series, and a second main relay connected to a negative terminal of the battery in series. A capacitor is connected in parallel to the first main relay and connected to the positive terminal of the battery.

8 Claims, 2 Drawing Sheets

BATTERY SAFETY DEVICE FOR VEHICLE AND METHOD OF DETECTING FAILURE THEREOF

CROSS-REFERENCE TO RELATED APPLICATION

This application claims under 35 U.S.C. §119(a) the benefit of priority to Korean Patent Application No. 10-2013-0128423 filed Oct. 28, 2013, the entire contents of which are incorporated herein by reference.

TECHNICAL FIELD

The present disclosure relates to a battery safety device for a vehicle which is capable of detecting and diagnosing all possible failures in a battery system main relay (SMR) connected to a battery terminal when a system main relay is powered on, and a method of detecting failure thereof.

BACKGROUND

An environment-friendly vehicle, which uses an engine and a motor as a driving power source, includes a battery for driving the motor. A battery safety device or a battery system main relay (SMR) of using a main relay is installed between a battery terminal and a power line to safely supply battery power.

Referring to FIG. 2, a battery safety device according to the related art includes three main relays 1, 2, and 3 and one resistor 4. The first and second main relays 1 and 2 are connected to a positive terminal of the battery 5 and the third main relay 3 is connected to a negative terminal of the battery 5. The resistor 4 is connected in series to the first main relay 1 which is connected to the positive terminal of the battery 5.

As the first to third main relays 1 to 3 are turned on one by one when the battery SMR is powered on, that is, the battery power is supplied to the power line, as shown in following Table 1, the battery safety device according to the related art detects failure, such as a welding failure of the main relay and an operational failure, through the initial step to third step.

TABLE 1

| | Condition | | |
|---|---|---|---|
| | $V_p = 0$ | $0 \ll V_p \ll V_{bat}$ | $V_p = V_{bat}$ |
| Initial step | Normal | SMR1 & 3 Weld | SMR1 & 2 & 3 weld or SMR2 & 3 weld |
| First step | Normal | SMR1 weld | SMR2 weld |
| Second step | SMR1 Non-operation or SMR3 Non-operation | Normal | SMR2 weld |
| Third step | — | SMR2 Non-operation | Normal |
| Fourth step | — | — | Normal |

As shown in Table 1, since all of the main relays are not operated in the initial step, if a measured voltage $V_p$ of the power line is higher than '0' and lower than a battery voltage $V_{bat}$, a welding failure of the first and third main relays 1 and 3 is detected. When the measured voltage $V_p$ is equal to the battery voltage $V_{bat}$, the welding failure of the first to third main relays 1 to 3 is detected.

Since the third main relay 3 is turned on in the first step, if the measured voltage $V_p$ of the power line is higher than '0' and lower than the battery voltage $V_{bat}$, a welding failure of the first main relay 1 is detected. When the measured voltage $V_p$ of the power line is equal to the battery voltage $V_{bat}$, a welding failure of the second main relay 2 is detected.

Since the first main relay 1 is turned on in the second step, if the measured voltage $V_p$ of the power line is equal to '0', an operational failure of the first or third main relay 3 is detected. When the measured voltage $V_p$ of the power line is equal to the battery voltage $V_{bat}$, the welding failure of the second main relay 2 is detected.

An operational failure of the second main relay 2 is detected if the measured voltage $V_p$ of the power line is higher than '0' and lower than the battery voltage $V_{bat}$, since the second main relay 2 is turned on in the third step.

However, the battery safety device according to the related art cannot independently detect a welding failure of the third main relay 3 when the battery SMR is powered on. In addition, the battery safety device according to the related art cannot independently detect an operational failure of the first and third main relays 1 and 3.

SUMMARY OF THE DISCLOSURE

The present disclosure has been made in an effort to solve the above-described problems associated with the related art. The present disclosure provides a battery safety device for a vehicle, which is capable of detecting all possible failures in a battery system main relay (SMR) connected to a battery terminal when the SMR is powered on, and a method of detecting failure thereof.

According to an exemplary embodiment of the present disclosure, a battery safety device for a vehicle is installed between a high-voltage battery mounted on the vehicle and a power line. The battery safety device includes a first main relay connected to a positive terminal of the battery in series, and a second main relay is connected to a negative terminal of the battery in series. A capacitor is connected in parallel to the first main relay and connected to the positive terminal of the battery.

Each main relay includes a normally open type relay.

The power line includes a positive line and a negative line. The positive line is connected to the positive terminal of the battery through the first main relay and the capacitor, and the negative line is connected to the negative terminal of the battery through the second main relay.

According to another exemplary embodiment of the present disclosure, a method of detecting failure of a battery safety device for a vehicle is provided. The battery safety device is installed between a high-voltage battery mounted on the vehicle and a power line. The battery safety device includes a first main relay connected \to a positive terminal of the battery in series, a second main relay connected to a negative terminal of the battery in series, and a capacitor connected in parallel to the first main relay and connected to the positive terminal of the battery. The method includes comparing a measured voltage ($V_p$) of the power line with a battery voltage ($V_{bat}$) and detecting whether the first and second main relays are broken based on a comparison result. The first main relay is turned on after the second relay is turned on when a battery system main relay (SMR) is powered on.

A welding failure of the second main relay is detected when the measured voltage ($V_p$) of the power line is higher than '0' and lower than the battery voltage (Vbat) before the first and second main relays are turned on.

An operational failure of the second main relay is detected when the measured voltage (Vp) of the power line is equal to '0' in a state that the second main relay is turned on, and the first main relay is turned off.

The welding failure of the first main relay is detected when the measured voltage (Vp) of the power line is equal to the battery voltage (Vbat) in a state that the second main relay is turned on, and the first main relay is turned off.

The operational failure of the first main relay is detected when the measured voltage (Vp) of the power line is higher than '0' and lower than the battery voltage (Vbat) in a state that the first and second main relays are turned on.

As compared with the related art, the present disclosure has the following advantages:

1. All possible failures in the battery SMR connected to a battery terminal are detectable and diagnosable when the SMR is powered on.
2. The number of used main relays is reduced compared with the related art, so that a simplified structure may improve robustness.
3. The failure detecting process is optimized according to the modified structure, so that a process may be shortened compared with the related art.
4. Instead of the resistor of the related art, a capacitor is used, so that power loss may be reduced.

BRIEF DESCRIPTION OF THE DRAWINGS

The above and other features of the present disclosure will now be described in detail with reference to certain exemplary embodiments thereof illustrated by the accompanying drawings which are given hereinbelow by way of illustration only, and thus are not limitative of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

DETAILED DESCRIPTION

Hereinafter the present disclosure will be described to be easily embodied by those skilled in the art.

The present disclosure provides a battery safety device for a vehicle which is installed between a high-voltage battery mounted on the vehicle and a power line to regulate the battery output, and a method of detecting a failure thereof. Thus, all failures of main relays connected to a battery terminal are detected in a power-on state.

Figure 1:
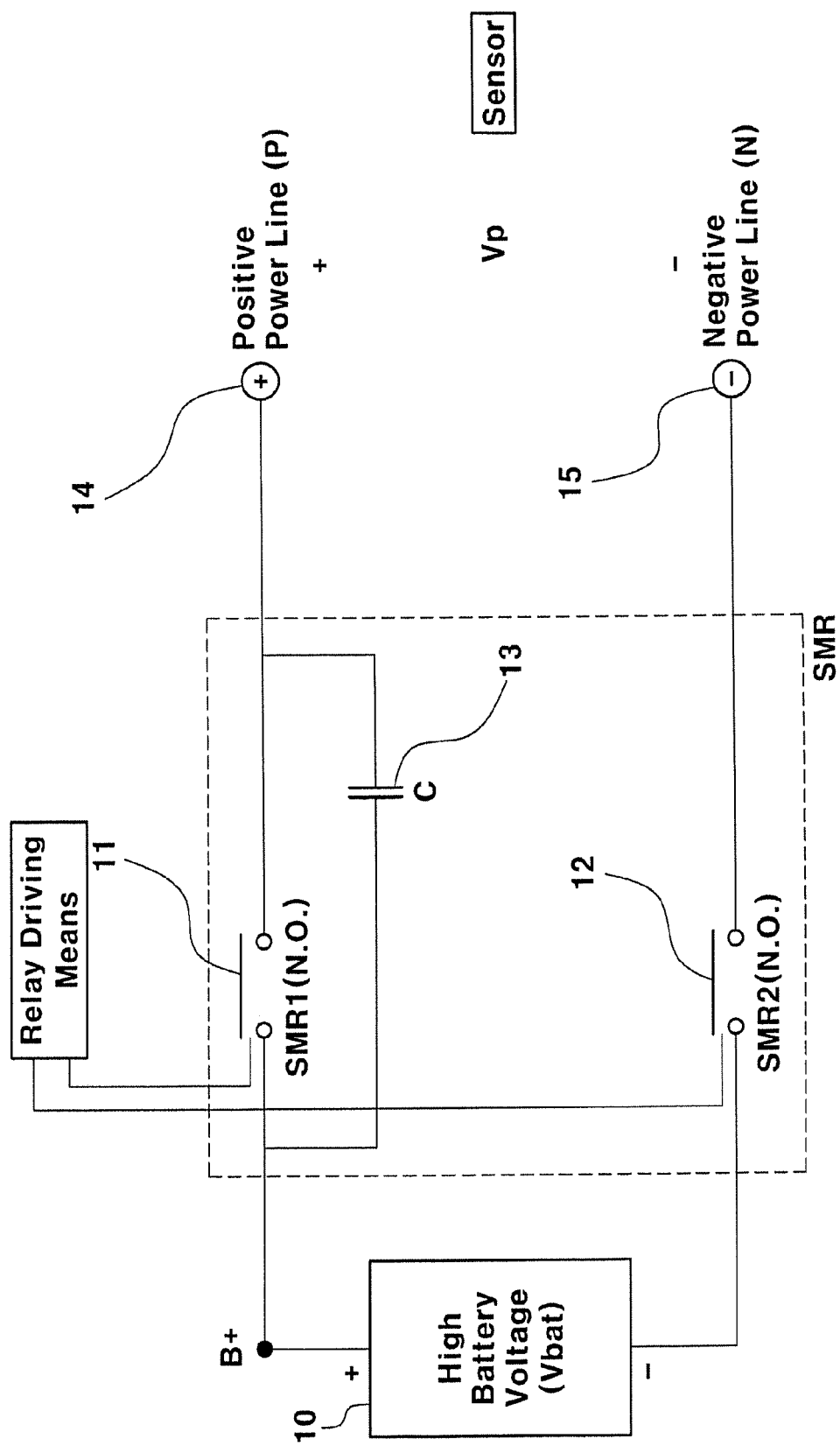
FIG. 1 is a circuit diagram showing a battery safety device for a vehicle according to an embodiment of the present disclosure.

As shown in FIG. 1, a battery safety device according to the present disclosure includes two main relays 11 and 12 connected to a battery terminal for a vehicle and one capacitor 13.

A first main relay 11 is connected to a positive terminal of a battery 10, and a second main relay 12 is connected to a negative terminal of the battery 10 in series. The capacitor 13 connected in parallel to the first main relay 11 is connected to the positive terminal of the battery 10.

A positive power line 14 is connected to the positive terminal of the battery 10 through the first main relay 11 and the capacitor 13. A negative power line 15 is connected to the negative terminal of the battery 10 through the second main relay 12.

The terminals of the first and second main relays 11 and 12 and the capacitor 13 are connected to the power line 14 and 15 to which the power of the battery 10 is supplied.

A normal open type relay may be used as the main relays 11 and 12. While the normal open type relay is maintained in a turn-off state, the normal open type relay is turned on when a battery system main relay (SMR) is powered on.

Figure 2:
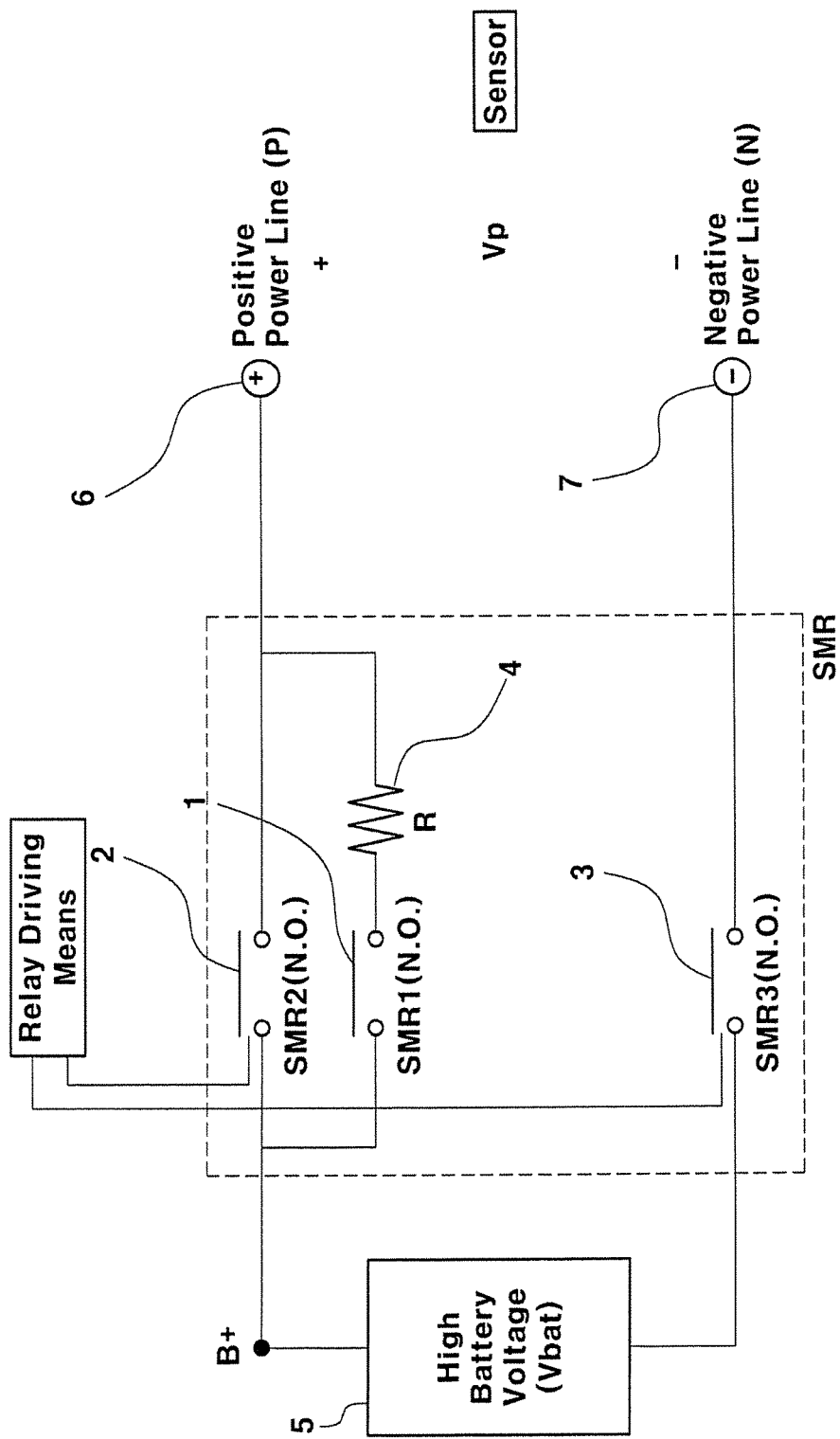
FIG. 2 is a circuit diagram showing a battery safety device for a vehicle according to the related art.

The battery safety device uses the capacitor 13 to reduce a voltage difference between the battery 10 and the power lines 14 and 15 so that durability is improved. Thus, a part of the power consumed in a resistor of the battery safety device according to the related art (see reference numeral '4' of FIG. 2) may be recovered. As well known in the art, the capacitor is an open-circuit after being completely charged. Therefore, the battery safety device may perform a function beyond that of the battery safety device (See FIG. 2) of the related art.

When the battery power is supplied to the power lines 14 and 15 so that the main relays 11 and 12 are powered on, the first and second main relays 11 and 12 are sequentially turned on. Thus, the battery safety device according to an exemplary embodiment may detect a welding failure and operational failure of the main relays through the initial to second steps shown in following Table 2.

TABLE 2

| | Condition | | |
|---|---|---|---|
| | Vp = 0 | 0 << Vp < Vbat | Vp = Vbat |
| Initial step | Normal | SMR2 weld | SMR1 & 2 weld |
| First step | SMR2 non-operation | Normal | SMR1 weld |
| Second step | — | SMR1 non-operation | Normal |

In the initial step, since the first and second main relays 11 and 12 are turned off, a measured voltage Vp of the power lines 14 and 15 is equal to '0.' Since the second main relay 12 is stuck on when a welding failure occurs in the second main relay 12, the capacitor 13 is charged by the battery power when the welding failure occurs in the second main relay 12 in the initial step. Thus, when the welding failure occurs in the second main relay 12 in the initial step, the measured voltage Vp of the power lines 14 and 15 is higher than '0' and lower than a battery voltage Vbat.

The first and second main relays 11 and 12 are stuck on when a welding failure occurs in the first and second main relays 11 and 12. Thus, when the welding failure occurs in the first and second main relays 11 and 12 in the initial step, the measured voltage Vp of the power lines 14 and 15 has a value equal to that of the battery voltage Vbat.

When the measured voltage Vp of the power lines 14 and 15 is higher than '0' and lower than the battery voltage Vbat, the welding failure of the second main relay 12 is detected. When the measured voltage Vp of the power lines 14 and 15 is equal to the battery voltage Vbat, the welding failure of the first and second main relays 11 and 12 is detected.

When the battery safety device processes from the initial step to the first step, due to a voltage drop by the capacitor 13, the voltage difference between the battery 10 and the power line 14 and 15 are reduced. Further, the possibility of the welding failure caused when the first main relay is turned on in the second step is reduced. Since the second main relay 12 is first turned on when the main relay is powered on, when the measured voltage Vp of the power lines 14 and 15 is higher than '0' and lower than the battery voltage Vbat in the first step, the SMR is in a normal state.

In the first step, since the positive terminal of the battery 10 is short-circuited with the positive power line 14 through the second main relay 12, when the measured voltage Vp of the power lines 14 and 15 is equal to '0,' an operational failure of the second main relay 12 is detected. When the measured voltage Vp is equal to the battery voltage Vbat, a welding failure of the first main relay 11 is detected.

In the second step, since the first main relay 11 is turned on after the second main relay 12 is turned on, when the measured voltage Vp of the power lines 14 and 15 is equal to the battery voltage Vbat, the main relays are in the normal state. In the second step, when the operational failure occurs in the first main relay 11, the positive terminal of the battery 10 is short-circuited with the positive power line 14 through the capacitor 13. Therefore, if the measured voltage Vp of the power lines 14 and 15 is higher than '0' and lower than the battery voltage Vbat, the operational failure of the first main relay 11 is detected.

In the case of the battery safety device configured above, the process of detecting failure of the main relays is shortened compared with that of the related art, and all the failures may be completely detected when the main relays are powered on. In other words, according to the battery safety device of the present disclosure, in the power-on state, the welding and operational failures of the first and second main relays 11 and 12 may be distinguished and detected. That is, the welding and operational failures of the first and second main relays 11 and 12 may be detected, respectively.

Meanwhile, failures that may be detected when the main relays are powered off will be described with reference to following Table 3.

TABLE 3

| | Condition | | |
|---|---|---|---|
| | Vp = 0 | 0 << Vp < Vbat | Vp = Vbat |
| Initial step | — | — | Normal |
| First step | — | Normal | SMR1 weld |
| Second step | Normal | SMR2 weld | — |

Since the first and second main relays 11 and 12 are turned on in the initial step when the main relays are powered on, it is normal that the measured voltage Vp of the power lines 14 and 15 is equal to the battery voltage Vbat.

In the first step, since the first main relay 11 is first turned off when the main relays are powered off, it is normal that the measured voltage Vp of the power lines 14 and 15 is higher than '0' and lower than the battery voltage Vbat. Since the second main relay 12 is already in the turn-on state in the first step, when the measured voltage Vp of the power lines 14 and 15 is equal to the battery voltage Vbat, the welding failure of the first main relay 11 is detected.

In the second step, since the second main relay 12 is turned off after the first main relay 11 is turned off in the first step, the measured voltage Vp of the power lines 14 and 15 must be equal to '0' in the normal state. Since the first and second main relays 11 and 12 are turned off in the second step, when the measured voltage Vp of the power lines 14 and 15 is higher than '0' and lower than the battery voltage Vbat, the welding failure of the second main relay 12 is detected.

The present disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A battery safety device for a vehicle, which is installed between a battery mounted on the vehicle and a power line, the battery safety device comprising:
    a first main relay connected to a positive terminal of the battery in series;
    a second main relay connected to a negative terminal of the battery in series; and
    a capacitor connected in parallel to the first main relay and connected to the positive terminal of the battery,
    wherein the battery safety device is configured such that the first main relay is turned on after the second main relay is turned on when a battery system main relay (SMR) comprising the first and second main relays is powered on.

2. The battery safety device of claim 1, wherein each main relay includes a normally open type relay.

3. The battery safety device of claim 1, wherein the power line includes a positive line and a negative line,
    the positive line is connected to the positive terminal of the battery through the first main relay and the capacitor, and
    the negative line is connected to the negative terminal of the battery through the second main relay.

4. A method of detecting failure of a battery safety device for a vehicle, wherein the battery safety device is installed between a battery mounted on the vehicle and a power line, and the battery safety device includes: a first main relay connected to a positive terminal of the battery in series; a second main relay connected to a negative terminal of the battery in series; and a capacitor connected in parallel to the first main relay and connected to the positive terminal of the battery, the method comprising:
    comparing a measured voltage (Vp) of the power line with a battery voltage (Vbat) of the battery; and
    detecting whether the first and second main relays are broken based on a comparison result,
    wherein the first main relay is turned on after the second main relay is turned on when a battery system main relay (SMR) comprising the first and second main relays is powered on.

5. The method of claim 4, wherein a welding failure of the second main relay is detected when the measured voltage (Vp) of the power line is higher than '0' and lower than the battery voltage (Vbat) before the first and second main relays are turned on.

6. The method of claim 4, wherein an operational failure of the second main relay is detected when the measured voltage (Vp) of the power line is equal to '0' in a state that the second main relay is turned on and the first main relay is turned off.

7. The method of claim 4, wherein a welding failure of the first main relay is detected when the measured voltage (Vp) of the power line is equal to the battery voltage (Vbat) in a state that the second main relay is turned on and the first main relay is turned off.

8. The method of claim 4, wherein an operational failure of the first main relay is detected when the measured voltage (Vp) of the power line is higher than '0' and lower than the battery voltage (Vbat) in a state that the first and second main relays are turned on.

* * * * *